United States Patent

Andrasko

(10) Patent No.: US 8,099,229 B2
(45) Date of Patent: Jan. 17, 2012

(54) METHOD AND APPARATUS FOR LIMITING WHEEL SLIP

(75) Inventor: Steven J. Andrasko, Wixom, MI (US)

(73) Assignee: GM Global Technology Operations LLC

( * ) Notice: Subject to any disclaimer, the term of this patent is extended or adjusted under 35 U.S.C. 154(b) by 464 days.

(21) Appl. No.: 12/356,165

(22) Filed: Jan. 20, 2009

(65) Prior Publication Data

US 2009/0222191 A1 Sep. 3, 2009

Related U.S. Application Data

(60) Provisional application No. 61/033,164, filed on Mar. 3, 2008.

(51) Int. Cl.
- G06F 19/00 (2006.01)
- B60K 28/16 (2006.01)
- F01N 3/10 (2006.01)
- F02D 41/08 (2006.01)

(52) U.S. Cl. ............. 701/110; 123/339.21; 60/311; 180/197; 701/82

(58) Field of Classification Search ............ 123/339.19, 123/339.21, 361, 396, 399, 403, 347, 348, 123/350, 352; 701/82, 84, 85, 101–103, 701/110, 114; 180/197; 60/274, 311
See application file for complete search history.

(56) References Cited

U.S. PATENT DOCUMENTS

| | | | | |
|---|---|---|---|---|
| 4,709,194 A | * | 11/1987 | Yagi et al. | 180/197 |
| 4,850,446 A | | 7/1989 | Leiber et al. | |
| 5,367,997 A | * | 11/1994 | Kawamura et al. | 123/399 |
| 5,651,341 A | * | 7/1997 | Harada et al. | 123/339.2 |
| 5,852,996 A | * | 12/1998 | Nakamura et al. | 123/399 |
| 6,002,979 A | * | 12/1999 | Ishizu | 701/84 |
| 7,124,012 B2 | * | 10/2006 | Feder et al. | 701/101 |
| 7,219,004 B2 | * | 5/2007 | Kolmanovsky et al. | 701/104 |

FOREIGN PATENT DOCUMENTS

| | | |
|---|---|---|
| DE | 3634240 | 4/1988 |
| DE | 3728572 | 3/1989 |
| DE | 4028809 | 3/1992 |
| DE | 69110501 | 2/1996 |
| DE | 10135143 | 1/2003 |
| DE | 102007017821 | 10/2008 |
| JP | 04081541 A * | 3/1992 |

OTHER PUBLICATIONS

German Office Action, dated Jul. 5, 2011, from German Patent Office, for Application No. 102009010653.7, 5 pages.

* cited by examiner

*Primary Examiner* — Willis Wolfe, Jr.

(57) ABSTRACT

An engine control system comprises an engine speed control module and an idle limiting module. The engine speed control module selectively controls an engine based on an idle speed request. The idle limiting module selectively reduces the idle speed request by an amount that is based on a wheel slip value.

20 Claims, 4 Drawing Sheets

METHOD AND APPARATUS FOR LIMITING WHEEL SLIP

CROSS-REFERENCE TO RELATED APPLICATIONS

This application claims the benefit of U.S. Provisional Application No. 61/033,164, filed on Mar. 3, 2008. The disclosure of the above application is incorporated herein by reference.

FIELD

The present disclosure relates to limiting wheel slip of a vehicle, and more particularly to controlling the engine to limit wheel slip.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine 102 and exhaust system 106 for a vehicle is presented. The engine 102 combusts a mixture of air and diesel fuel to produce torque. The resulting exhaust gas is expelled from the engine 102 into the exhaust system 106. The exhaust system 106 includes an exhaust manifold 108, a diesel oxidation catalyst (DOC) 110, a reductant injector 112, a mixer 114, and a diesel particulate filter (DPF) assembly 116.

The exhaust gas flows from the engine 102 through the exhaust manifold 108 to the DOC 110. The DOC 110 oxidizes particulate unburned hydrocarbon in the exhaust gas as the exhaust gas flows through the DOC 110. The reductant injector 112 may inject a reductant, such as ammonia or urea, into the exhaust system 106. The mixer 114, which may be implemented as a baffle, agitates the exhaust gas and the injected reductant.

The DPF assembly 116 filters particulate from the exhaust gas passing through it. This particulate may accumulate within the DPF assembly 116 and may restrict the flow of exhaust gas through the DPF assembly 116. The particulate may be removed from the DPF assembly 116 by a process called regeneration. A heater assembly 118 may be used to initiate the regeneration process.

SUMMARY

An engine control system comprises an engine speed control module and an idle limiting module. The engine speed control module selectively controls an engine based on an idle speed request. The idle limiting module selectively reduces the idle speed request by an amount that is based on a wheel slip value.

A method comprises selectively controlling an engine based on an idle speed request and selectively reducing the idle speed request by an amount that is based on a wheel slip value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
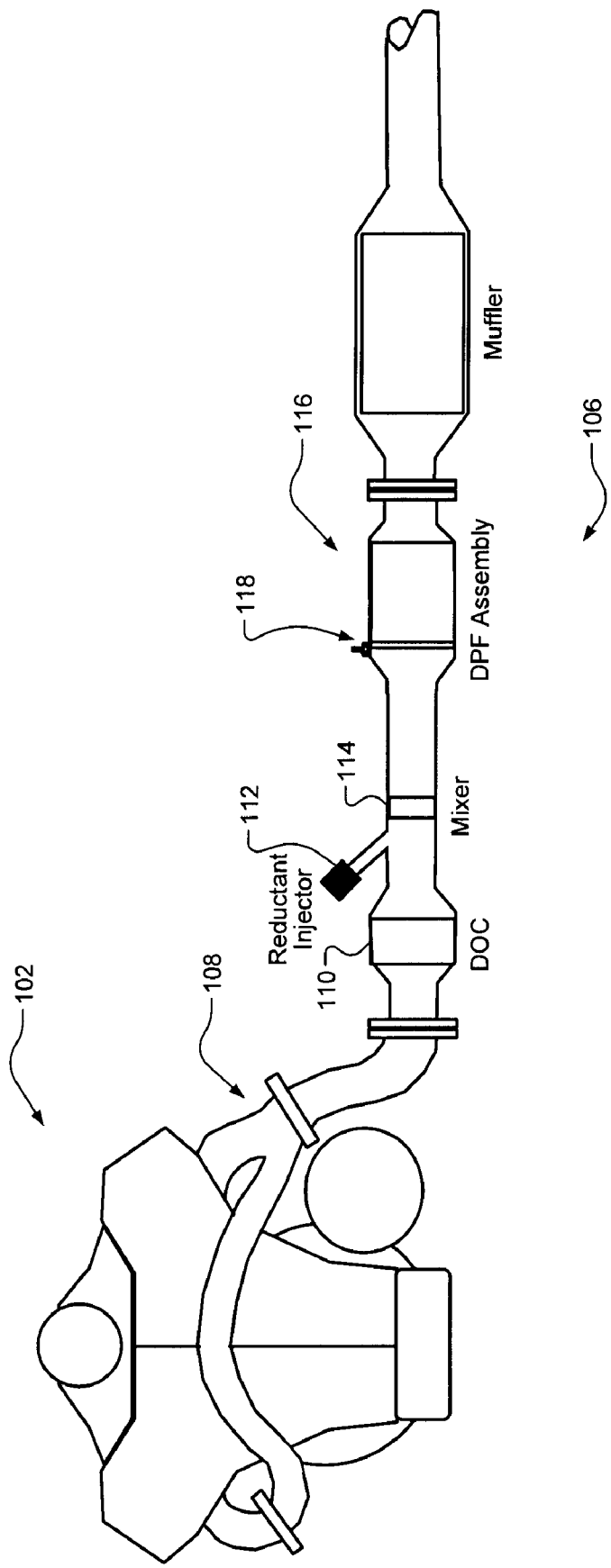
FIG. 1 is a functional block diagram of an engine and exhaust system for a vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

On surfaces having a low coefficient of friction, drive wheels of a vehicle may slip, even when the engine is idling and the accelerator pedal is not being pressed. Wheel slip is more likely to occur when idle speeds are high. For example only, diesel engines may naturally have a higher idle speed. Further, various operating modes, such as diesel particulate filter (DPF) regeneration, may increase idle speed.

In addition, torque converters that more suddenly transmit torque to the drivetrain may increase the likelihood of wheel slip. For example, diesel engines may use tight torque converters that allow less slip. Therefore, when the brake pedal is released, engine torque may be suddenly transmitted to the drivetrain, possibly causing wheel slip. According to the principles of the present disclosure, a control system may reduce the commanded idle speed in order to reduce the amount of wheel slip.

Figure 2:
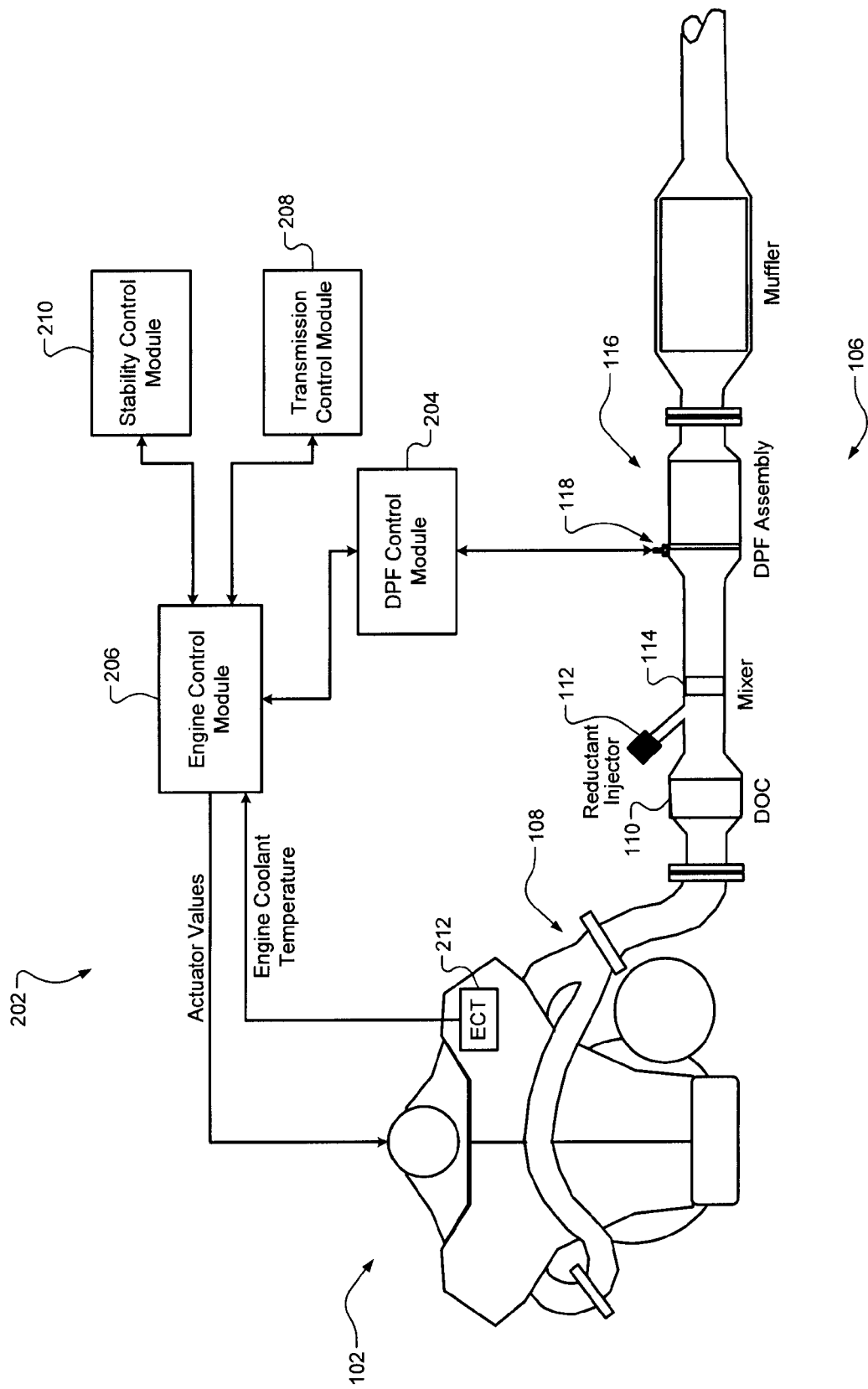
FIG. 2 is a functional block diagram of an engine, an exhaust system, and a control system according to the principles of the present disclosure.

Referring now to FIG. 2, a functional block diagram of an engine 102, an exhaust system 106, and a control system 202 is presented. While the engine 102 will be described herein as a diesel engine, the present disclosure also applies to other engine systems, such as spark ignition engine systems. The control system 202 includes a DPF control module 204, an engine control module 206, a transmission control module 208, and a stability control module 210. The DPF control module 204 may control the regeneration process in the DPF assembly 116. The DPF control module 204 may receive a reading of an outlet temperature of the DPF assembly 116. The DPF control module 204 communicates with the engine control module 206.

The engine control module 206 outputs actuator values to the engine 102 to achieve a desired engine torque or engine speed. For example, the engine control module 206 may control the amount of turbocharger boost, the positions of intake and exhaust cam phasers, the amount of exhaust gas recirculation (EGR), the amount of airflow, and/or the amount of fuel injected into cylinders of the engine 102. The engine control module 206 receives information about the currently-selected gear from the transmission control module 208.

In addition, the engine control module 206 receives information about wheel slip from the stability control module 210. For example only, the wheel slip information may be communicated over a vehicle network, such as a controller area network (CAN). The engine control module 206 may also receive an engine coolant temperature (ECT) signal from an ECT sensor 212.

Figure 3:
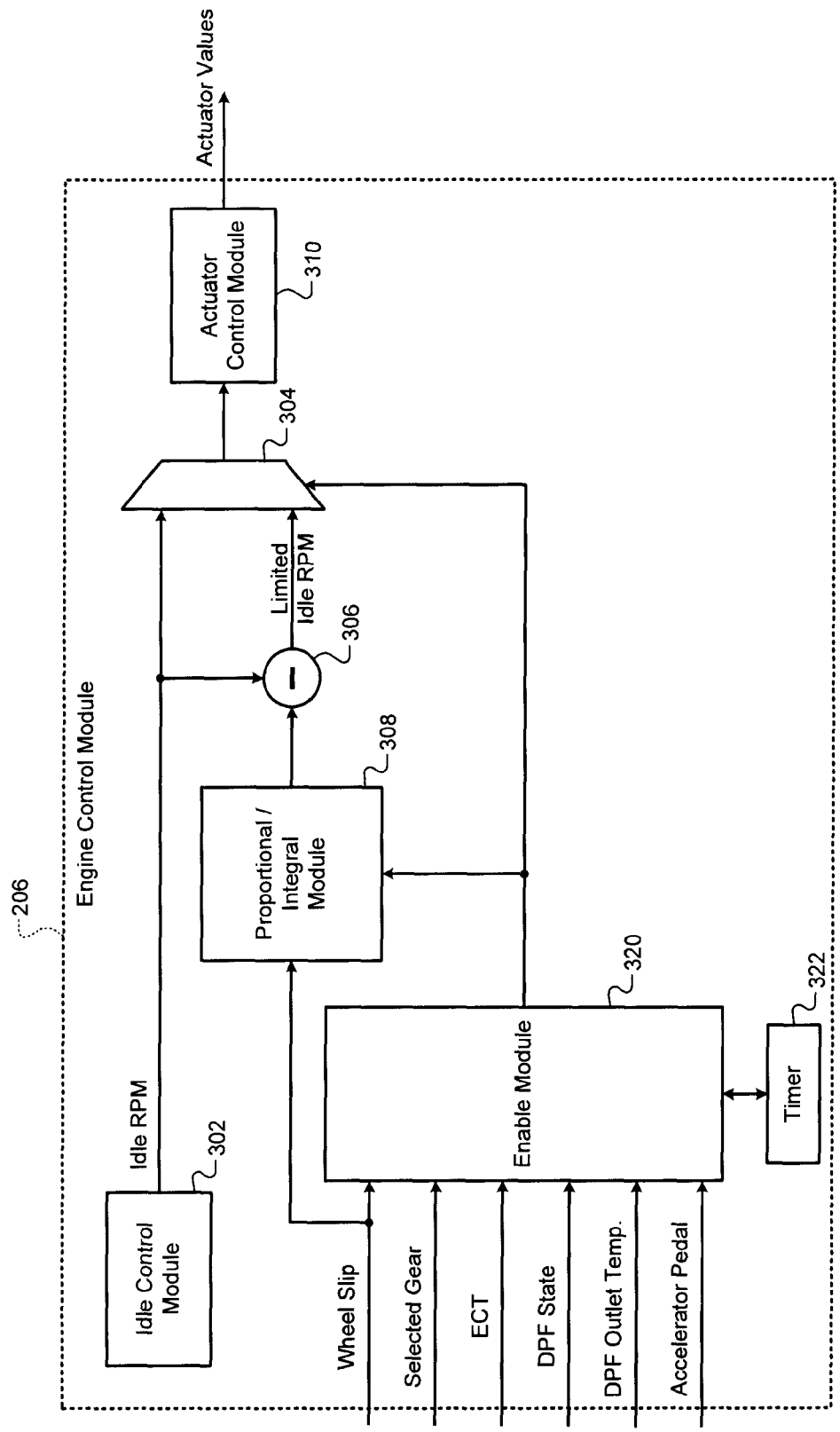
FIG. 3 is a functional block diagram of an exemplary implementation of the engine control module according to the principles of the present disclosure.

Referring now to FIG. 3, a functional block diagram of an exemplary implementation of the engine control module 206 according to the principles of the present disclosure is presented. The engine control module 206 includes an idle control module 302 that generates a desired idle RPM.

A multiplexer 304 receives the desired idle RPM from the idle control module 302 and a limited idle RPM from a subtraction module 306. The multiplexer 304 outputs either the idle RPM or the limited idle RPM to an actuator control module 310. The actuator control module 310 generates actuator values for the engine 102 to achieve the selected idle RPM.

The selected output of the multiplexer 304 is determined by an enable signal from an enable module 320. For example only, when the enable module 320 outputs an enable signal, the multiplexer 304 may select the limited idle RPM from the subtraction module 306. Otherwise, the multiplexer 304 may select the idle RPM from the idle control module 302.

The enable module 320 may generate the enable signal based on wheel slip and other conditions. For example, the enable module 320 may generate the enable signal when the amount of wheel slip is greater than a threshold. In various implementations, hysteresis may be used. For example, the enable module 320 may begin generating the enable signal when the wheel slip increases above a first threshold, and may stop generating the enable signal once the wheel slip falls below a second threshold that is less than the first threshold.

The enable module 320 may communicate with a timer 322, which may limit the amount of time the enable signal will be generated. For example, once the wheel slip increases past the first threshold, the timer 322 may be reset, and the enable module 320 may stop producing the enable signal once the timer 322 reaches a predetermined value. The predetermined value may be based upon operating conditions and/or may be calibrated. For example, the predetermined period may be 15 seconds. Once the timer is exceeded, the enable module 320 may wait to generate the enable signal until the wheel slip falls below the second threshold.

The enable module 320 may limit generation of the enable signal to times when the selected gear is either first gear or reverse. In addition, the enable module 320 may limit generation of the enable signal to when the engine coolant temperature is above a threshold. The engine coolant temperature threshold may be established to avoid engine smoking at low engine temperatures. In various implementations, hysteresis may be used and two engine coolant temperature thresholds defined.

The enable module 320 may also limit generation of the enable signal to times when the DPF is not undergoing regeneration. However, if the DPF is undergoing regeneration and a temperature, such as the outlet temperature, of the DPF is high enough, the enable module 320 may still generate the enable signal. Hysteresis may also be used with the DPF outlet temperature. The enable module 320 may also limit generation of the enable signal to when the driver is applying little or no pressure to the accelerator pedal.

The enable signal may be sent to the PI module 308. When the enable signal is first received, the PI module 308 may be initialized. For example, the PI module 308 may be initialized to the values in use when the enable signal was last generated. The PI module 308 may generate an offset that is subtracted from the idle RPM from the idle control module 302 by the subtraction module 306.

The offset is based on a term that is proportional to an error value and a term that is based on an integration of the error value. The error value may be determined by subtracting acceptable wheel slip from the measured wheel slip. The acceptable wheel slip may be a calibratable value, such as two percent or three percent. The proportional term may be equal to a proportional constant times the error value, while the integral value may be equal to an integral over time of the error value multiplied by an integral constant. Upon initialization, the integral may be set to zero.

A maximum reduction and/or a minimum idle RPM may be defined. For example, the PI module 308 may be prevented from reducing the idle RPM by more than a predetermined value, such as 200 RPM. Alternatively, the subtraction module 306 may be prevented from producing a limited idle RPM less than a predetermined value, such as 600 RPM.

Figure 4:
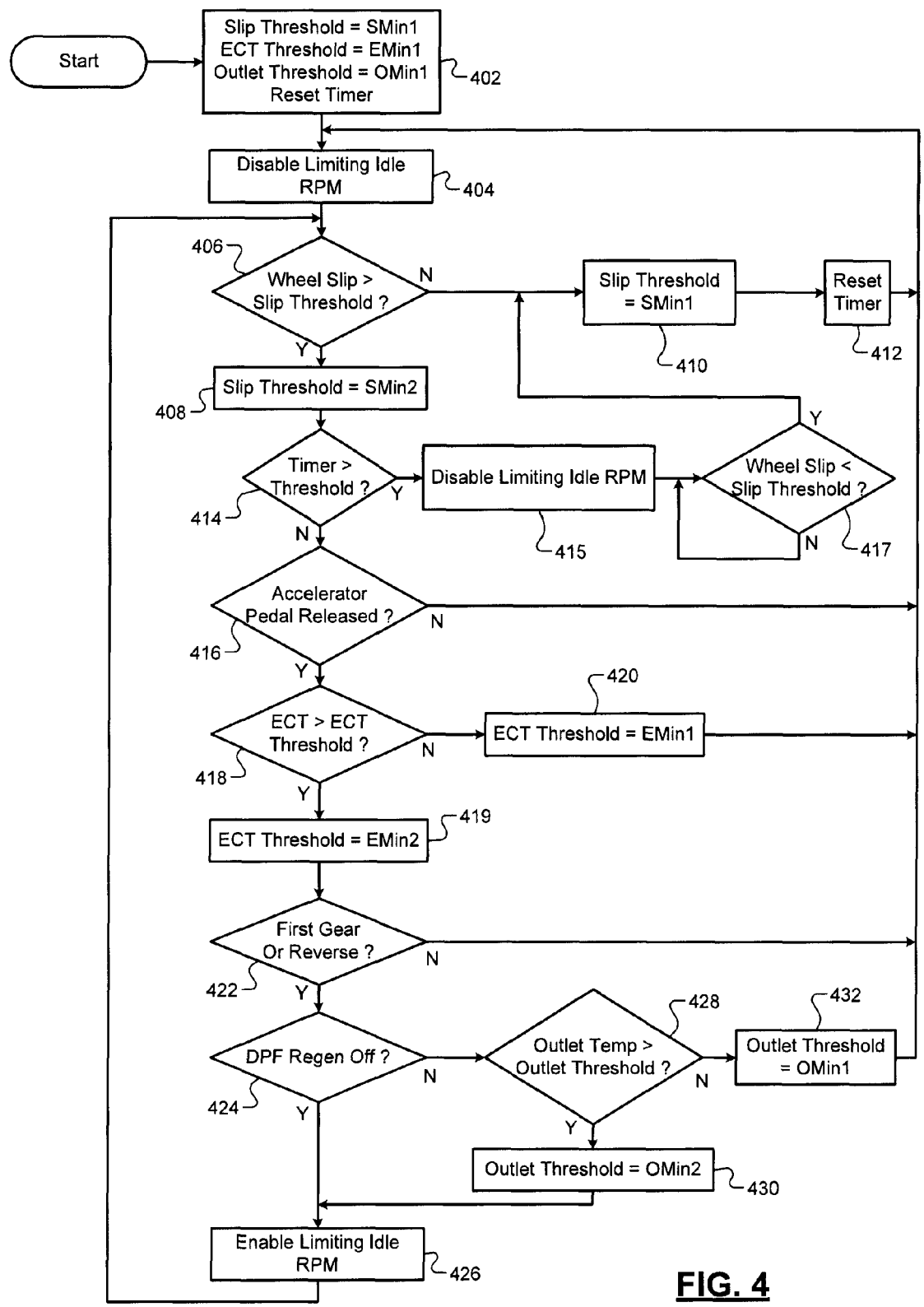
FIG. 4 is a flowchart depicting exemplary operation of the engine control module according to the principles of the present disclosure.

Referring now to FIG. 4, a flowchart depicts exemplary operation of the engine control module 206. Control begins in step 402, where thresholds are initialized and a timer is reset. For example, a wheel slip threshold, an engine coolant temperature threshold, and a DPF outlet temperature threshold may be defined.

For each of these thresholds, a first and second value may be defined. Having two values allows for hysteresis. For example, idle RPM limiting may be enabled when the wheel slip increases past a first threshold and may be disabled when the wheel slip decreases below a second threshold, where the second threshold is less than the first threshold.

In step 402, slip, ECT, and outlet threshold variables are set to first (upper) values. Control continues in step 404, where limiting of the idle RPM is disabled. Control continues in step 406, where control determines whether the measured wheel slip is greater than the slip threshold. If so, control transfers to step 408; otherwise, control transfers to step 410. In step 410, the slip threshold variable is set to the upper value. Control continues in step 412, where the timer is reset and control returns to step 404.

In step 408, the slip threshold variable is set to a second (lower) value. Control continues in step 414, where control determines whether the timer is greater than a predetermined threshold. If so, control transfers to step 415; otherwise, control transfers to step 416. In step 415, control disables limiting of the idle RPM and continues in step 417. In step 417, control determines whether the wheel slip is less than the slip threshold. If so, control transfers to step 410; otherwise, control remains in step 417.

In step 416, control determines whether pressure on the accelerator pedal is less than a predetermined threshold. If so, control transfers to step 418; otherwise, control returns to step 404. In various implementations, control may transfer to step 418 when the driver is applying no pressure to the accelerator pedal.

In step 418, control determines whether the engine coolant temperature is greater than the ECT threshold variable. If so, control transfers to step 419; otherwise, control transfers to step 420. In step 420, the ECT threshold variable is set to the upper value. Control then returns to step 404.

In step 419, the ECT threshold variable is set to a second (lower) value. Control continues in step 422, where control determines whether the transmission is in either first gear or reverse. If so, control transfers to step 424; otherwise, control returns to step 404. In step 424, control determines whether DPF regeneration is off. If so, control transfers to step 426; otherwise, control transfers to step 428. In step 428, control determines whether the DPF outlet temperature is greater than the outlet threshold variable. If so, control transfers to step 430; otherwise, control transfers to step 432.

In step 432, the outlet threshold variable is set equal to the upper value and control returns to step 404. In step 430, the outlet threshold variable is set equal to a second (lower) value and control continues is step 426. In step 426, idle RPM limiting is enabled, and control returns to step 406. The idle RPM may be limited based on the amount of measured wheel slip.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
    an engine speed control module that selectively controls an engine based on an idle speed request; and
    an idle limiting module that selectively reduces the idle speed request by an amount that is based on a wheel slip value.

2. The engine control system of claim 1 wherein the idle limiting module determines the amount based on a proportional term and an integral term.

3. The engine control system of claim 2 wherein the proportional term is proportional to an error value and the integral term is proportional to an integration of the error value, and wherein the error value is based on a difference between the wheel slip value and a predetermined wheel slip value.

4. The engine control system of claim 1 further comprising an enable module that selectively generates an enable signal, wherein the idle limiting module reduces the idle speed request when the enable signal is generated.

5. The engine control system of claim 4 wherein the enable module selectively generates the enable signal when the wheel slip value is greater than a predetermined threshold.

6. The engine control system of claim 5 wherein the enable module stops generating the enable signal a predetermined period after starting to generate the enable signal.

7. The engine control system of claim 6 wherein the predetermined period is restarted when the wheel slip value falls below the predetermined threshold.

8. The engine control system of claim 4 wherein the enable module stops generating the enable signal based on at least one of an accelerator pedal being pressed, an engine coolant temperature being less than a first threshold, a transmission being in a gear higher than a first gear, and a particulate filter regeneration process being active.

9. The engine control system of claim 8 wherein the enable module stops generating the enable signal when both the particulate filter regeneration process is active and an outlet temperature of the particulate filter is less than a second threshold.

10. The engine control system of claim 9 wherein the first threshold is adjusted once crossed to create hysteresis and wherein the second threshold is adjusted once crossed to create hysteresis.

11. A method comprising:
    selectively controlling an engine based on an idle speed request; and
    selectively reducing the idle speed request by an amount that is based on a wheel slip value.

12. The method of claim 11 further comprising determining the amount based on a proportional term and an integral term.

13. The method of claim 12 further comprising determining an error value based on a difference between the wheel slip value and a predetermined wheel slip value, wherein the proportional term is proportional to the error value and the integral term is proportional to an integration of the error value, and wherein the amount is determined based on a sum of the proportional and integral terms.

14. The method of claim 11 further comprising:
    selectively generating an enable signal; and
    reducing the idle speed request when the enable signal is generated.

15. The method of claim 14 further comprising selectively generating the enable signal when the wheel slip value is greater than a predetermined threshold.

16. The method of claim 15 further comprising stopping generating the enable signal a predetermined period after starting to generate the enable signal.

17. The method of claim 16 further comprising restarting the predetermined period when the wheel slip value falls below the predetermined threshold.

18. The method of claim 14 further comprising stopping generating the enable signal based on at least one of an accelerator pedal being pressed, an engine coolant temperature being less than a first threshold, a transmission being in a gear higher than a first gear, and a particulate filter regeneration process being active.

19. The method of claim 18 further comprising stopping generating the enable signal when both the particulate filter regeneration process is active and an outlet temperature of the particulate filter is less than a second threshold.

20. The method of claim 19 wherein the first threshold is adjusted once crossed to create hysteresis and wherein the second threshold is adjusted once crossed to create hysteresis.

* * * * *